United States Patent
Banerjee et al.

(10) Patent No.: US 7,487,242 B2
(45) Date of Patent: *Feb. 3, 2009

(54) METHOD AND APPARATUS FOR SERVER LOAD SHARING BASED ON FOREIGN PORT DISTRIBUTION

(75) Inventors: Dwip N. Banerjee, Austin, TX (US); Deanna Lynn Quigg Brown, Pflugerville, TX (US); Lilian Sylvia Fernandes, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/873,510

(22) Filed: Oct. 17, 2007

(65) Prior Publication Data

US 2008/0040454 A1     Feb. 14, 2008

Related U.S. Application Data

(63) Continuation of application No. 10/388,973, filed on Mar. 13, 2003, now Pat. No. 7,310,667.

(51) Int. Cl.
*G06F 1/26* (2006.01)
(52) U.S. Cl. .................. 709/224; 709/227; 709/229; 370/389; 713/320
(58) Field of Classification Search ............... 709/224, 709/227, 229; 713/320; 370/389, 401

See application file for complete search history.

(56) References Cited

U.S. PATENT DOCUMENTS

| 5,488,533 | A | * | 1/1996 | Cassidy ..................... 361/93.1 |
| 5,815,664 | A |   | 9/1998 | Asano |
| 6,026,425 | A | * | 2/2000 | Suguri et al. ................. 718/105 |
| 6,061,349 | A |   | 5/2000 | Coile et al. |
| 6,104,717 | A |   | 8/2000 | Coile et al. |
| 6,298,063 | B1 |   | 10/2001 | Coile et al. |
| 6,732,116 | B2 | * | 5/2004 | Banerjee et al. ............. 707/102 |
| 7,310,667 | B2 | * | 12/2007 | Banerjee et al. ............. 709/224 |
| 2003/0009482 | A1 | * | 1/2003 | Benerjee et al. ............. 707/200 |
| 2003/0167295 | A1 | * | 9/2003 | Choo ......................... 709/104 |
| 2003/0187812 | A1 | * | 10/2003 | Theimer et al. ................ 707/1 |

FOREIGN PATENT DOCUMENTS

| JP | 11-316726 | 11/1999 |
| JP | 2000-138713 | 5/2000 |
| JP | 2001-022714 | 1/2001 |
| JP | 2002-150000 | 5/2002 |

* cited by examiner

*Primary Examiner*—Khanh Dinh
(74) *Attorney, Agent, or Firm*—Duke W. Yee; Diana L. Roberts-Gerhardt; Wayne P. Bailey

(57) ABSTRACT

A method, apparatus, and computer instructions for handling requests in a data processing system. A plurality of processes is provided to handle the requests. Each of the plurality of processes is assigned to handle requests from a subset of foreign ports within a plurality of foreign ports such that a set of foreign ports assigned to a process is unique with respect to other subsets of foreign ports within the plurality of foreign ports. A foreign port is identified in a request in response to receiving the request. The request is sent to a process assigned the subset of foreign ports having a match to the foreign port in the request, wherein the process handles the request.

13 Claims, 2 Drawing Sheets

METHOD AND APPARATUS FOR SERVER LOAD SHARING BASED ON FOREIGN PORT DISTRIBUTION

This application is a continuation of application Ser. No. 10/388,973, filed Mar. 13, 2003 now U.S. Pat. No. 7,310,667, status: allowed.

BACKGROUND OF THE INVENTION

1. Technical Field

The present invention relates to an improved data processing system, and in particular to a method, apparatus, and computer instructions for processing requests. Still more particularly, the present invention provides a method, apparatus and computer instructions for server load sharing to process requests from clients.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the Transmission Control Protocol/Internet Protocol (TCP/IP) suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML).

In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

The various connection requests for web pages and applications are handled by servers, such as web servers and FTP servers. These servers are often under heavy loads, which typically occur when a large number of clients demand services at the same time. This problem is often solved by spawning or creating slave servers to perform the work. In this scheme, the main server continues to accept new connections and immediately distributes these connections to the slave servers. Such a system, however, still has a bottle neck. The bottle neck is the main server, which has a single socket for listening for all incoming connections.

Therefore, it would be advantageous to have an improved method, apparatus, and computer instructions for server load sharing.

SUMMARY OF THE INVENTION

The present invention provides a method, apparatus, and computer instructions for handling requests in a data processing system. A plurality of processes is provided to handle the requests. Each of the plurality of processes is assigned to handle requests from a subset of foreign ports within a plurality of foreign ports. In these examples, the assignments are such that a set of foreign ports assigned to a process is unique with respect to other subsets of foreign ports within the plurality of foreign ports. A foreign port is identified in a request in response to receiving the request. The request is sent to a process assigned the subset of foreign ports having a match to the foreign port in the request, wherein the process handles the request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
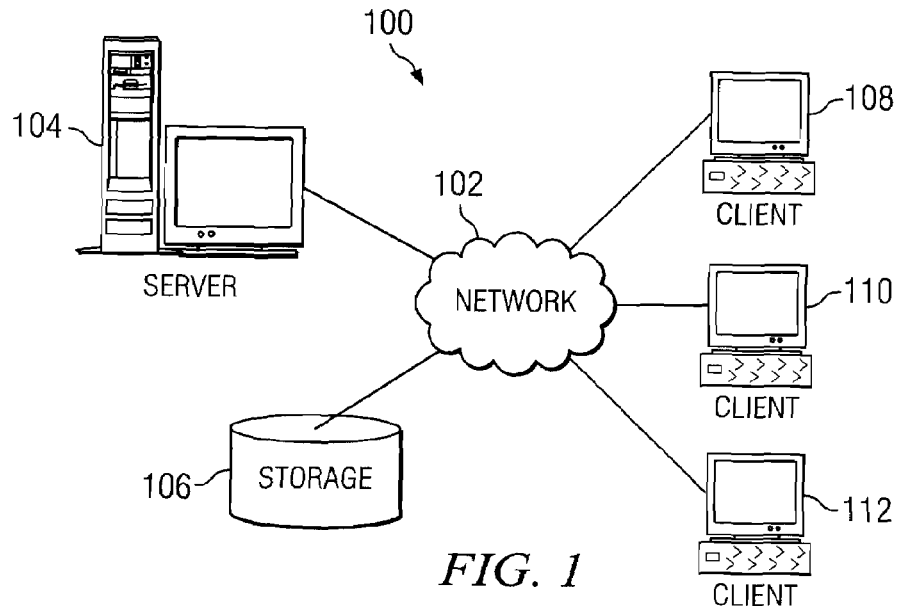
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server computer 104 is connected to network 102 along with storage unit 106. In addition, clients 108, 110, and 112 are connected to network 102. These clients 108, 110, and 112 may be, for example, personal computers or network computers.

In the depicted example, server computer 104 provides data, such as boot files, operating system images, and applications to clients 108-112. Clients 108, 110, and 112 are clients to server computer 104. Network data processing system 100 may include additional server computers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
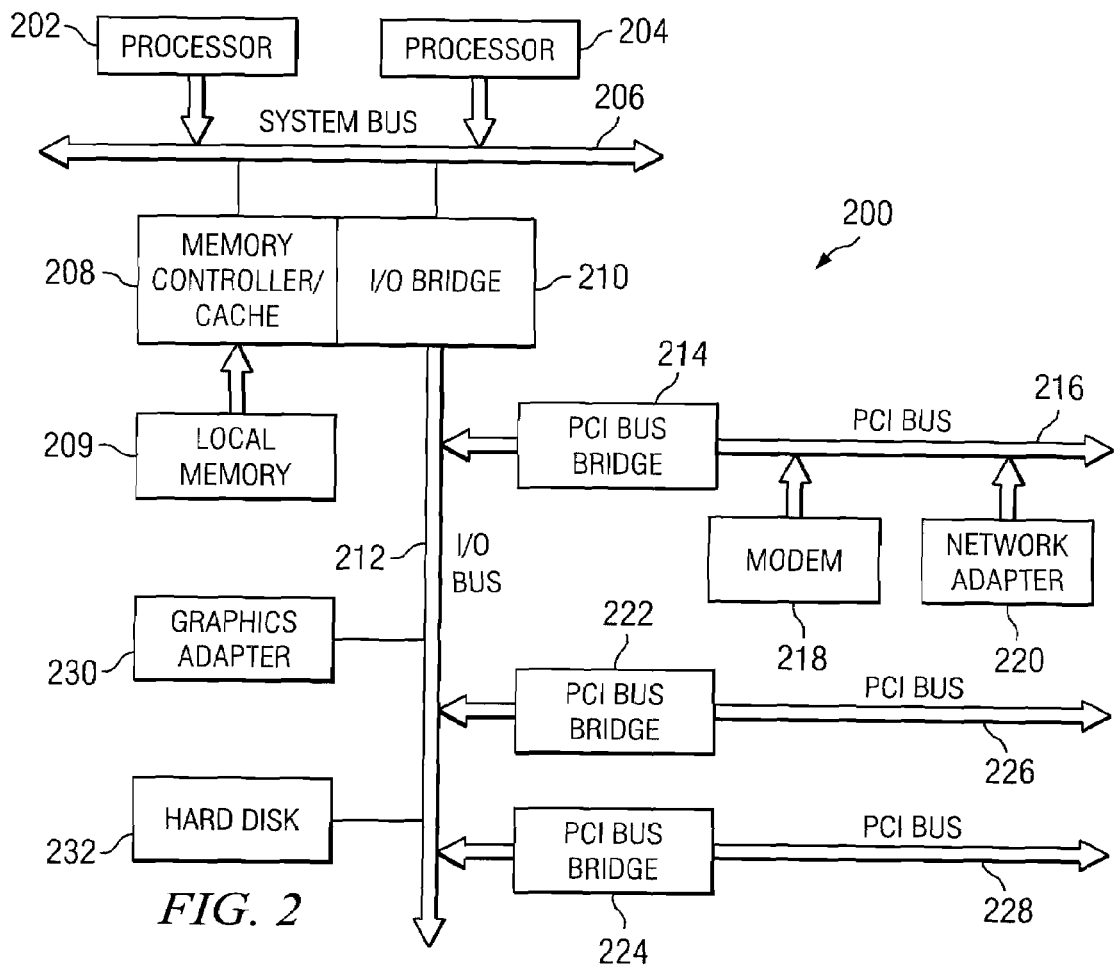
FIG. 2 is a block diagram of a data processing system that may be implemented as a server computer in accordance with a preferred embodiment of the present invention.

Referring to FIG. 2, a block diagram of a data processing system that may be implemented as a server computer, such as server computer 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a method, apparatus, and computer instructions for server load sharing based on foreign port distribution. In particular, the mechanism of the present invention allows for a socket to be bound to a set of foreign ports, rather than any and all foreign ports. A socket is a mechanism used to direct data to an appropriate application in a network that uses a TCP/IP stack. This stack provides transport functions to ensure that the total amount of bytes sent is correctly received. This stack also is used to route messages based on addresses. An IP address and a port number make up a socket. In these examples, a socket is associated with a server, which is also referred to as a server process. As used herein, the term "server", when used alone, refers to a process, rather than the actual computer or machine. In this manner, multiple servers may be employed to listen for different foreign ports in handling connections. In these examples, a connection is identified using a local IP (LIP) address, a foreign IP (FIP) address, a local port (LP), and a foreign port (FP). Normally, servers use sockets that accept connections from any foreign IP address and any foreign port as long as the local port number matches and the IP address belongs to the server.

According to the present invention, several servers are employed such that connections are distributed to these servers based on the foreign port. A "foreign port" is a number used to identify the process (client process in the present invention) on the remote machine that originated the TCP/IP request packet. This number is used at the transport layer of the TCP/IP protocol stack. The foreign port is used by the local process (server process in the present invention) to create a reply to the original packet. Using this number, the reply packet is ensured to reach the same client process that sent the request packet. According the present invention, each server is assigned a subset of the foreign ports. In the depicted examples, the subsets are unique to each other such that no foreign port is covered by more than one server. Of course, depending on the implementation, an overlap may be assigned to servers. With this assignment, each server listens for incoming connections on a socket. These sockets are bound to a set of foreign port numbers instead of accepting connections from all port numbers.

This mechanism does not require any modifications to clients making requests for connections. Modifications, however, are required in the TCP/IP stack used to direct incoming connection requests to the appropriate socket. Currently, only one foreign port number or a wild card port number, meaning all foreign port numbers are acceptable, can be specified in the TCP/IP stack. This modification requires an ability to specify a set of foreign port numbers. In other words, an additional feature allowing an assignment of foreign ports to different servers or sockets is implemented within a TCP/IP stack of the operating system in the server computer executing the processes of the present invention. In the depicted examples, the modification is made to the transport layer in the TCP/IP stack.

Figure 3:
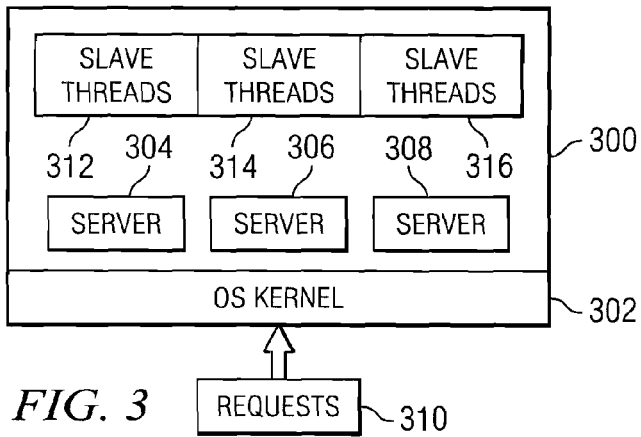
FIG. 3 is a diagram illustrating data flow in handling requests in accordance with a preferred embodiment of the present invention.

Turning next to FIG. 3, a diagram illustrating data flow in handling requests is depicted in accordance with a preferred embodiment of the present invention. Server computer 300 may be implemented in a data processing system, such as data processing system 200 in FIG. 2.

In accordance with a preferred embodiment of the present invention, a socket associated with a server may be bound to a set of foreign ports instead of all of the foreign ports. A request typically includes a local port address, a foreign port address, a local port number, and a foreign port number. Connections are established with server computer 300 by operating system (OS) kernel 302. In these examples, operating system kernel 302 accepts connections for handling if a match in the local port number is present and the local IP address is that assigned to server computer 300.

According to a preferred embodiment of the present invention, servers 304, 306 and 308 are employed to handle connections for requests 310 originating from different clients. The connections are sent to these servers by operating system kernel 302. More specifically, these connections are routed to the servers by a TCP/IP stack within operating system kernel 302. This routing of requests is performed based on the foreign port number in requests 310.

For example, if a foreign port range is 1025 to 4000, the port numbers may be distributed to servers 304, 306, and 308. In these examples, the foreign port numbers are distributed in a manner such that each server has a subset of the foreign port range that is unique. In other words, no overlap in foreign ports occurs between each of the subsets. Such a mechanism works well because foreign ports are typically assigned randomly by the client making the request. With a foreign port range of 1025 to 4000, the following assignment of foreign port numbers may be made as follows: server 304 handles foreign port numbers 1025, 1028, 1031, ... to 3098; server 306 handles foreign port numbers 1026, 1029, 1032, ... to 3099; and server 308 handles foreign port numbers 1027, 1030, 1033, ... to 4000.

In this manner, each server listens for incoming connections on a socket. These sockets, however, are bound to a set of foreign port numbers as described above instead of accepting all port numbers.

In these examples, server 304 is a master server process and servers 306 and 308 are slave server processes spawned by server 304. Alternatively these processes may act as master server processes with an ability to spawn slave server processes depending on the load at server computer 300. The processing of requests in these examples are handed off to slave threads, such as slave threads 312, 314, and 316. These slave threads may be spawned by servers 304, 306 and 308. In this example, slave threads 312 are spawned by server 304; slave threads 314 are spawned by server 306; and slave threads 316 are spawned by server 308.

This mechanism provides an advantage over current mechanisms because requests may be distributed to different servers to balance the load, rather than having a single server handle all of the connections. The mechanism of the present invention differs from a network dispatcher because the network dispatcher divides connections between different systems, but still is a bottle neck because this dispatcher employs a single socket number listening for all of the foreign port numbers. Further, the mechanism of the present invention requires no modifications to clients making requests. Only a modification to the TCP/IP stack is needed to allow for assignment of foreign ports to different sockets.

Figure 4:
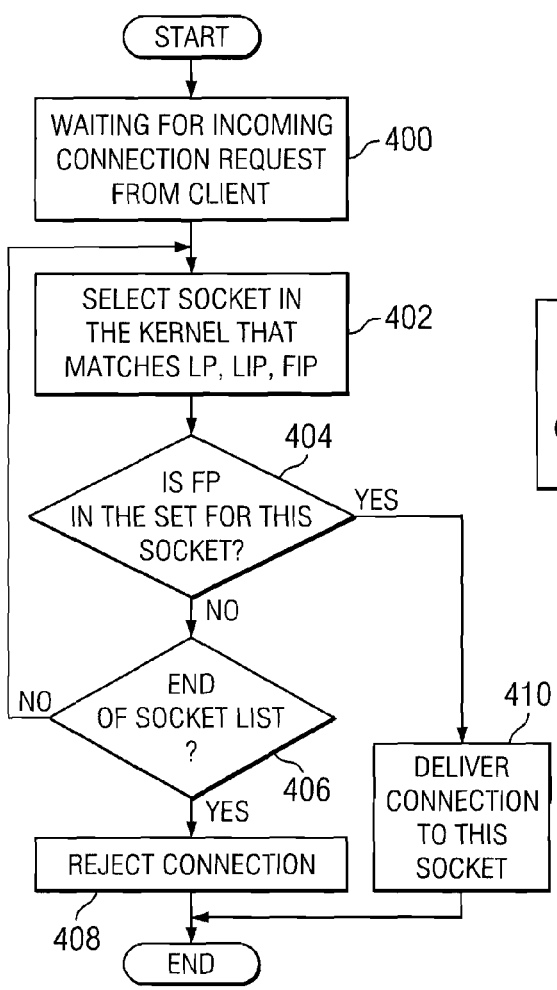
FIG. 4 is a flowchart of a process for handling connection requests in accordance with a preferred embodiment of the present invention.

Turning next to FIG. 4, a flowchart of a process for handling connection requests is depicted in accordance with a preferred embodiment of the present invention. The process illustrated in FIG. 4 may be implemented in an operating system, such as operating system kernel 302 in FIG. 3. In these examples, the mechanism is implemented in the TCP/IP stack.

The process begins by waiting for an incoming connection request by a client (step 400). After a request is received, a socket is selected in the kernel that matches the local port (LP), the local port IP (LIP) address, and the foreign IP (FIP) address (step 402). In these examples, multiple sockets are present in which each socket is assigned to a subset of foreign ports. Step 402 selects one of these sockets for processing.

Next, a determination is made as to whether the foreign port set in the request is part of the set of foreign ports assigned to the sockets (step 404). If the foreign port in the request is not within the set for the selected socket, a determination is made as to whether the end of the socket list has been reached (step 406). This step is used to determine whether all of the sockets have been processed. If all of the sockets have not been processed, the process returns to step 402 to select another socket. If all of these sockets have been processed, the process rejects the connection (step 408) with the process terminating thereafter.

With reference again to step 404, if the foreign port in the request is found within the set of foreign ports assigned to the socket, the connection is delivered to the socket (step 408) with the process terminating thereafter. In this instance, one of the server processes handles the connection requests.

Figure 5:
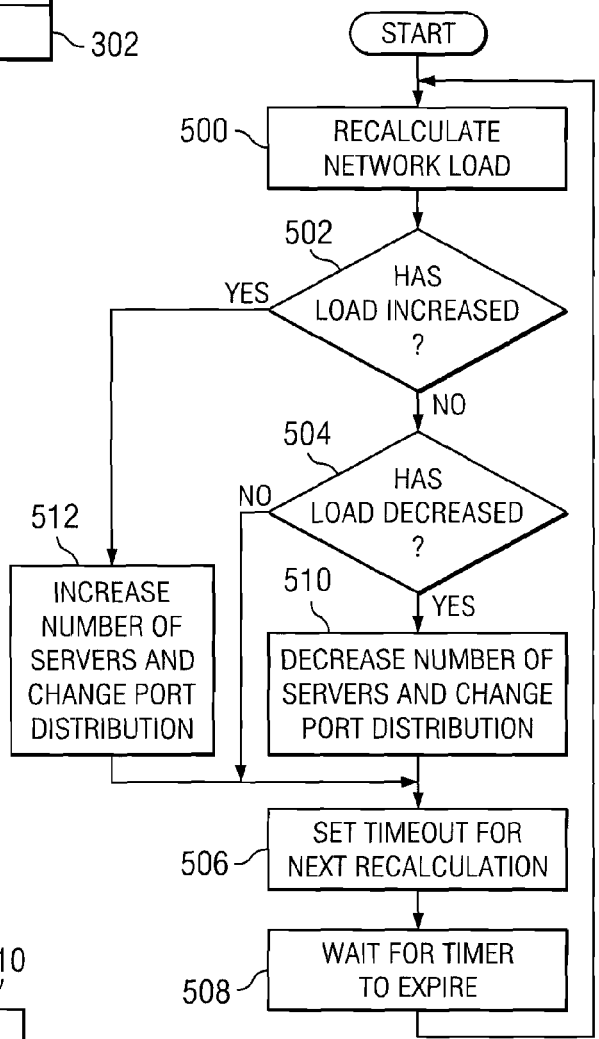
FIG. 5 is a flowchart of a process for spawning and removing server processes in accordance with a preferred embodiment of the present invention.

Turning next to FIG. 5, a flowchart of a process for spawning and removing server processes is depicted in accordance with a preferred embodiment of the present invention. The process illustrated in FIG. 5 may be implemented in an application, such as server 304 in FIG. 3. This sever may be, for example, a web server, a database server, or a FTP server.

The process begins by recalculating the network load (step 500). The network load may be calculated through various known processes. After the network load has been calculated, a determination is made as to whether the load had increased beyond a first threshold (step 502). If the load has not increased beyond this threshold, a determination is made as to whether the load has decreased below a second threshold (step 504). One parameter that may be used in setting a threshold is the rate of incoming connections. The lower threshold may be set using one rate of x incoming connections per minute, while the upper threshold may be set using another rate of y incoming connections per minute. The actual values for these thresholds depend on the particular implementation.

If the load has not decreased below the second threshold, a timeout is set for the next recalculation of the network load (step 506). Then, the process waits for a timer to expire (step 508). When the timer expires, the process returns to step 500 to recalculate the network load.

With reference again to step 504 if the load has decreased beyond the second threshold, the number of servers has decreased and the port distribution is changed (step 510). In these examples, the port distribution is changed for the foreign ports to set a unique subset of foreign ports for each remaining server.

Turning back to step 502, if the load has increased beyond the first threshold, the number of servers is increased and the port distribution is changed (step 512). In this case, the port distribution is changed to redistribute the foreign ports to all of the servers, including the newly spawned servers. The number of servers added or removed depends on the particular implementation. Further, the number of servers added or removed may depend on how much the network load has increased or decreased beyond the thresholds. The first threshold in step 502 and the second threshold in step 504 may be the same value or different value depending on the particular implementation.

Thus, the present invention provides a method, apparatus, and computer instructions for server load sharing based on foreign port distributions. The mechanism of the present invention avoids bottle necks currently present by dividing up a foreign port range into subsets and assigning these subsets to different servers. In illustrated examples, each subset is unique and has substantially the same number of ports with respect to other subsets. Of course, depending on the particular implementation, the subsets may include overlapping foreign port numbers and some subsets may include more foreign ports than others. With multiple servers listening to different sockets, assigned subsets of foreign ports, more than one server or process may listen for and handle requests for connections from clients.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for handling requests, the data processing system comprising:
   a bus system;
   a memory connected to the bus system, wherein the memory includes a set of instructions;
   a communications adapter connected to the bus system;
   a processing unit connected to the bus system, wherein the processing unit executes the set of instructions to provide a plurality of processes to handle the requests, wherein each of the plurality of processes is assigned a subset of foreign ports within a plurality of foreign ports, wherein each of the foreign ports is an identifier used to identify a remote process on a remote machine that originated a given request; identify a foreign port in a request in response to receiving the request; send the request to a process assigned to the subset of foreign ports having a match to the foreign port in the request, wherein the process handles the request; calculate a network load; add processes to the plurality of processes if the network load has increased beyond a first selected threshold; and remove processes from the plurality of processes if the network load has decreased more than a second selected threshold.

2. The data processing system of claim 1, wherein the subset of foreign ports is assigned such that the subset of foreign ports assigned to the process is unique with respect to other subsets of foreign ports within the plurality of foreign ports.

3. A data processing system for handling requests, the data processing system comprising:
   providing means for providing a plurality of processes to handle the requests, wherein each of the plurality of processes is assigned a subset of foreign ports within a plurality of foreign ports, wherein each of the foreign ports is an identifier used to identify a remote process on a remote machine that originated a given request;
   identifying means, responsive to receiving a request, identifying a foreign port in the request;
   sending means for sending the request to a process assigned the subset of foreign ports having a match to the foreign port in the request, wherein the process handles the request;
   calculating means for calculating a network load;
   adding means for adding processes to the plurality of processes if the network load has increased beyond a first selected threshold; and
   removing means for removing processes from the plurality of processes if the network load has decreased more than a second selected threshold.

4. The data processing system of claim 3, wherein the subset of foreign ports is assigned such that the subset of foreign ports assigned to the process is unique with respect to other subsets of foreign ports within the plurality of foreign ports.

5. The data processing system of claim 3, wherein the request is from a requestor and wherein the process handling the request establishes a connection with the requestor.

6. The data processing system of claim 3, wherein the request also includes a local port and a local IP address and further comprising:
   initiating means for initiating execution of the identifying means if the local port and the local IP address match a local port for the process and a local IP address for the process.

7. The data processing system of claim 3, wherein one process within the plurality of processes is a master process while remaining processes in the plurality of processes are slave processes.

8. The data processing system of claim 3 further comprising:
   spawning means, responsive to receiving the request by the process, spawning a slave process to process the request.

9. The data processing system of claim 3, wherein the plurality of processes are server processes.

10. A computer program product in a computer readable storage medium for handling requests received at a data processing system, the computer program product comprising:
    first instructions for providing a plurality of processes to handle the requests, wherein each of the plurality of processes is assigned a subset of foreign ports within a plurality of foreign ports, wherein each of the foreign ports is an identifier used to identify a remote process on a remote machine that originated a given request;
    second instructions, responsive to receiving a request, for identifying a foreign port in the request;

third instructions for sending the request to a process assigned the subset of foreign ports having a match to the foreign port in the request, wherein the process handles the request;

fourth instructions for calculating a network load;

fifth instructions for adding processes to the plurality of processes if the network load has increased beyond a first selected threshold; and sixth instructions for removing processes from the plurality of processes if the network load has decreased more than a second selected threshold.

11. The computer program product of claim 10, wherein the subset of foreign ports is assigned such that the subset of foreign ports assigned to the process is unique with respect to other subsets of foreign ports within the plurality of foreign ports.

12. The computer program product of claim 10, wherein the request also includes a local port and a local IP address and further comprising:

fourth instructions for initiating execution of the third instructions if the local port and the local IP address match a local port for the process and a local IP address for the process.

13. The computer program product of claim 10 further comprising:

fourth instructions, responsive to receiving the request by the process, for spawning a slave process to process the request.

* * * * *